(No Model.) 2 Sheets—Sheet 1.

J. A. BARNES.
CLUTCH.

No. 575,626. Patented Jan. 19, 1897.

Witnesses
Jas. E. Hutchinson.
G. F. Downing

Inventor
John A. Barnes,
By H. A. Seymour
Attorney (No Model.) 2 Sheets—Sheet 2.
J. A. BARNES.
CLUTCH.
No. 575,626. Patented Jan. 19, 1897.
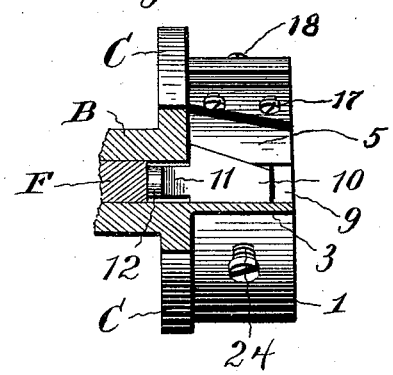
Fig. 4.
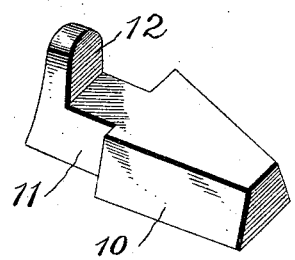
Fig. 5.
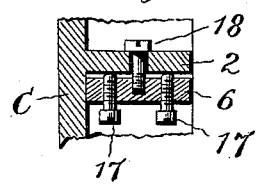
Fig. 6.
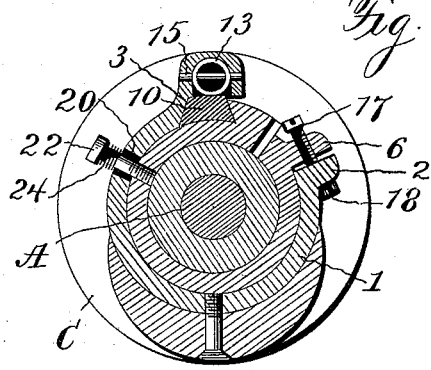
Fig. 6.ª
Witnesses
Jas. E. Hutchinson.
G. F. Downing.
Inventor
John A. Barnes,
By H. A. Seymour
Attorney

UNITED STATES PATENT OFFICE.

JOHN A. BARNES, OF WADSWORTH, OHIO.

CLUTCH.

SPECIFICATION forming part of Letters Patent No. 575,626, dated January 19, 1897.

Application filed March 27, 1896. Serial No. 585,107. (No model.)

*To all whom it may concern:*

Be it known that I, JOHN A. BARNES, a resident of Wadsworth, in the county of Medina and State of Ohio, have invented certain new and useful Improvements in Clutches; and I do hereby declare the following to be a full, clear, and exact description of the invention, such as will enable others skilled in the art to which it appertains to make and use the same.

My invention relates to an improvement in clutches, the object of the invention being to produce a clutch which shall comprise but few parts, be simple in construction and comparatively cheap to manufacture, and which shall be effectual in all respects in the performance of its functions.

With this object in view the invention consists in certain novel features of construction and combinations and arrangements of parts, as hereinafter set forth, and pointed out in the claims.

Figure 1:
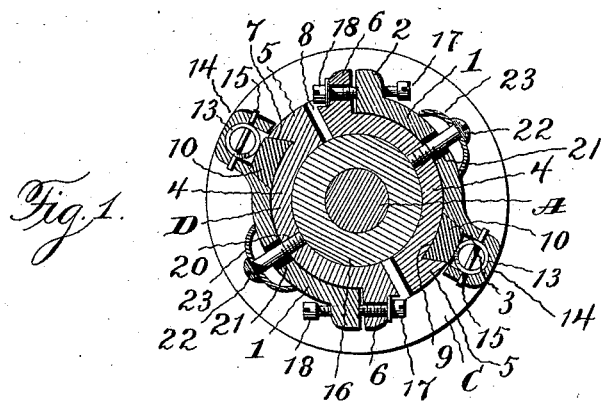
Figure 2:
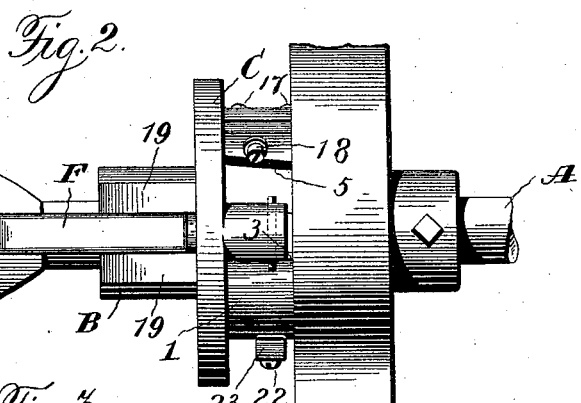
Figure 3:
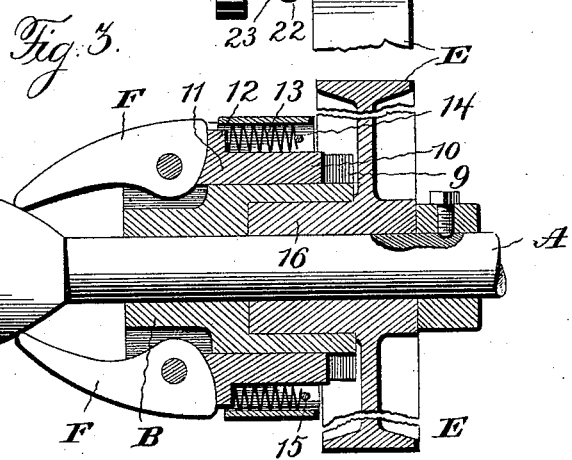

In the accompanying drawings, Figure 1 is a cross-sectional view embodying my improvements. Fig. 2 is an elevation. Fig. 3 is a longitudinal section. Figs. 4, 5, and 6 are detail views. Fig. 6ª illustrates a modification.

A represents a shaft or axle to which a sleeve B is adapted to be fixed. One end of the sleeve B is made with an integral disk C. Two curved flanges 1 1 project forwardly from the disk C, preferably at points inwardly from the periphery of said disk, said flanges being concentric with the shaft or axle A and being so disposed that, if they were joined together, they would form a ring or cylinder. One end of each flange 1 is made with a lug or shoulder 2, having a face which is preferably perpendicular to the disk and at right angles to the shaft or axle A. The other end of each flange 1 is made with a lug or shoulder 3, which may also be perpendicular to the disk C, but which is preferably beveled transversely. A ring D is located within the cylinder formed by the curved flanges 1 1, and normally lies concentric with said flanges when the clutch is not in use. The ring D is made in two parts 4 4. Each section 4 of the expansible ring D is beveled at each end. One end of each section 4 is also provided with a lug 5 and the other end with a lug 6, one face of each lug conforming to the beveled end of the section of the ring D from which it projects, and said lugs being made to project into or through the spaces between the ends of the curved flanges 1 1. The rear or inner portion of the outer face of each lug 5 is beveled or inclined with respect to the disk C and also transversely, as at 7, while the forward portion 8 of said face of each lug 5 may be made practically perpendicular to the disk C and beveled slightly transversely. In each space 9, between the lugs 5 and the beveled ends of the flanges 1, a wedge 10 is disposed and made to conform to the outer face of the expansible ring D. The wedges are also made to conform to the faces 8 of the lugs 5 and the beveled ends of the flanges 1. Each wedge 10 is made with a shank 11, adapted to pass loosely through a hole in the disk C, and the lower end of each shank 11 is made with a laterally-projecting lug 12, which forms a seat for a coiled spring 13. Each coiled spring 13 is disposed within a pocket 14, made integral with the disk C, and at their upper ends said springs bear against pins 15, passed transversely through the walls of the pockets 14.

A pulley E is loosely mounted on the shaft or axle A and provided with a hub 16, which loosely enters the clutch-ring D.

In order to properly adjust the sections of the clutch-ring D relatively to the hub 16, so that the movements of said ring to clutch the hub will be reduced to a minimum, adjusting-screws 17 (preferably two in number) will be passed through each lug 6 of the sections 4 of the ring and made to bear against the lugs 2 of the curved flanges 1. A screw 18 is made to pass freely through each lug 2 and enter a screw-threaded socket in the adjacent lug 6 of the clutch-ring, whereby to retain the ends of the screws 17 against the lugs 2.

Ears 19 19 are made integral with the rear face of the disk C and the sleeve A at diametrically opposite points and between each pair of lugs a lever F is pivotally connected, one end of each lever being adapted to engage the shank or stem of one of the wedges 10 and the other end being disposed in proximity to the shaft, where it is adapted to be engaged and operated by means of the usual conical sleeve G or in any other suitable manner.

From this construction and arrangement of parts it will be seen that when the levers F are turned on their fulcrums the wedges will be forced outwardly and the sections of the clutch-ring D made to bend and clutch the hub 16, thus locking the pulley to the shaft or axle A. When the levers F are turned in the opposite direction to release the pulley from the shaft or axle, the wedges will be forced back by means of the coiled springs 13 and the sections of the clutch-ring permitted to expand, so as to relieve their frictional contact with the hub 16. By the peculiar formation of the wedges and the faces against which they bear, and also by the use of the springs 13, there will be no danger of the wedges binding, and the release of the clutch-ring from the hub 16 will therefore be certain. The springs 13 also serve to retain the stems of the wedges against the levers G and prevent the latter from being thrown out by centrifugal force when the pulley is revolving on the shaft but not clutched to it.

It is desirable to provide means whereby the sections of the clutch-ring will be maintained against the inner faces of the flanges 1 1 when the clutch is not in use, and for this purpose the devices now to be described will be employed. Each section 4 of the clutch-ring will be made with a screw-threaded socket 20, and in line with said sockets the curved flanges 1 1 are made with elongated slots 21. Through the latter screws 22 loosely pass and enter the sockets in the sections of the clutch-ring. Between the head of each screw 22 and the outer face of the flanges 1 a spring 23 is disposed, said springs serving to withdraw the sections of the clutch-ring when the pressure exerted by the wedges shall have been relieved. The springs 23 may be flat or semielliptical, as shown in Fig. 1, or coiled springs 24 may be employed, as shown in Figs. 4 and 6$^a$.

In the form of the invention shown in Fig. 6$^a$ a single flange 1 on the disk C is employed, and the clutch-ring is made in a single piece instead of in sections, as above described.

In the modified form of the invention only one wedge and lever are employed.

My improvements are simple in construction, accurate in operation, and effectual in all respects in the performance of their functions.

Various slight changes might be made in the details of construction of my invention without departing from the spirit thereof or limiting its scope, and hence I do not wish to limit myself to the precise details of construction herein set forth; but, Having fully described my invention, what I claim as new, and desire to secure by Letters Patent, is—

1. In a clutch, the combination with a disk, a curved flange projecting therefrom and a lug at one end of said curved flange, of a clutch-ring having a lug disposed coincident with the lug on the flange, adjusting-screws passing through the lug on the curved flange and adapted to bear against the lug on the clutch-ring, a screw passing loosely through the lug on the clutch-ring and entering a screw-threaded socket in the lug on the curved flange, a beveled lug projecting from said clutch-ring, and a wedge between the beveled lug and the end of said curved flange, substantially as set forth.

2. In a clutch, the combination with a disk and a curved flange projecting therefrom, of a clutch-ring having a lug to bear against one end of said curved flange, a beveled lug projecting from the clutch-ring, a wedge between the beveled lug and the end of the curved flange, a shank projecting from said wedge and passing through the disk, a lip or lug at the rear end of said shank, a pocket on the disk, a spring in said pocket bearing at one end against said lip or lug of the wedge-shank, and a pin passing through the walls of said pocket against which the other end of the spring bears, and means for moving said wedge forwardly, substantially as set forth.

3. In a clutch, the combination with a disk and a curved flange projecting therefrom, of a clutch-ring adapted at one end to engage said curved flange and having a beveled lug at its other end, a wedge entering between said beveled lug and the curved flange, a lip projecting from said wedge, a pocket on the disk, and a spring in said pocket having a bearing at one end within the pocket and at the other end against said lip on the wedge, substantially as set forth.

4. In a clutch, the combination with a disk and two curved flanges projecting from said disk, of a clutch-ring disposed within said curved flanges and made in two sections, a lug at one end of each section of the clutch-ring disposed coincident with one end of each curved flange, a beveled lug at the other end of each section of the clutch-ring, wedges between said beveled lugs and the ends of the curved flanges and two levers pivotally connected with the disk and adapted to operate the respective wedges whereby to contract the clutch-ring and cause it to clutch a hub projecting within it, substantially as set forth.

In testimony whereof I have signed this specification in the presence of two subscribing witnesses.

JOHN A. BARNES.

Witnesses:
JOHN J. STAUFFER,
JOHN A. CLARK.